United States Patent
Krumm, Sr. et al.

(10) Patent No.: US 6,851,684 B2
(45) Date of Patent: Feb. 8, 2005

(54) HAND TRUCK FOR MOVING, MANIPULATING, AND ALIGNING OBJECTS

(76) Inventors: Walter E. Krumm, Sr., 3890 NW. Gainesville Rd., Ocala, FL (US) 34475; Marty Brooks, 3890 NW. Gainesville Rd., Ocala, FL (US) 34475

( * ) Notice: Subject to any disclaimer, the term of this patent is extended or adjusted under 35 U.S.C. 154(b) by 0 days.

(21) Appl. No.: 10/034,124

(22) Filed: Jan. 3, 2002

(65) Prior Publication Data

US 2003/0011156 A1 Jan. 16, 2003

Related U.S. Application Data

(63) Continuation of application No. 09/498,760, filed on Jan. 27, 2000, now abandoned.
(60) Provisional application No. 60/117,428, filed on Jan. 27, 1999.

(51) Int. Cl.$^7$ .................................................. B62B 1/26
(52) U.S. Cl. ...................................................... 280/47.27
(58) Field of Search ........................ 280/47.131, 47.17, 280/47.18, 47.24, 47.26, 47.28, 47.29, 79.2, 79.3, 79.4, 79.5

(56) References Cited

U.S. PATENT DOCUMENTS

| | | | | |
|---|---|---|---|---|
| 2,745,675 A | | 5/1956 | Haynes | 280/47.24 |
| 3,830,387 A | | 8/1974 | Virnig | 280/79.4 |
| 4,614,350 A | | 9/1986 | Bunch | 280/47.24 |
| 5,378,004 A | | 1/1995 | Gunlock et al. | 280/47.29 |
| 5,415,420 A | | 5/1995 | Koeller | 280/47.28 |
| 5,472,220 A | | 12/1995 | Stephan | 280/79.5 |
| 5,513,939 A | | 5/1996 | Martin et al. | 280/47.24 |
| 5,975,543 A | * | 11/1999 | Mosher et al. | 280/47.24 |
| 6,120,042 A | * | 9/2000 | Mosher et al. | 280/47.24 |
| 6,332,620 B1 | * | 12/2001 | Mosher et al. | 280/47.24 |
| 6,382,644 B1 | * | 5/2002 | Rawlings | 280/79.4 |
| 6,413,032 B1 | * | 7/2002 | Casper | 280/47.24 |

FOREIGN PATENT DOCUMENTS

| | | | | |
|---|---|---|---|---|
| DE | 35 44 458 | | 7/1986 | 280/47.24 |
| FR | 2634716 | * | 2/1990 | 280/79.5 |
| SU | 1158488 | | 5/1985 | 280/79.4 |
| SU | 1227542 | | 4/1986 | 280/47.24 |
| SU | 1646938 | * | 5/1991 | 280/79.4 |

* cited by examiner

Primary Examiner—Frank Vanaman
(74) Attorney, Agent, or Firm—Shlesinger, Arkwright & Garvey LLP

(57) ABSTRACT

Cart includes a body, a wheel attached to the body, and a support ring movably attached to the body. The support ring may be sufficiently flexible so that the support ring can accommodate different objects. The support ring may be rotatably attached to the body. A handle may be provided on the body. An extension may be provided between the handle and the body. Two spaced apart wheels may be provided. The support ring may include a mouth for enhancing the flexibility of the support ring. A lock may be provided for selectively restricting movement of the movable attached support ring. The lock may include a chain having a hook which may be disposed on the handle for securing the chain. The hook may be a s-hook. One or more blocks may be provided on the support ring, the blocks being of different sizes for reducing the effective inner diameter of the support ring by different amounts.

16 Claims, 3 Drawing Sheets

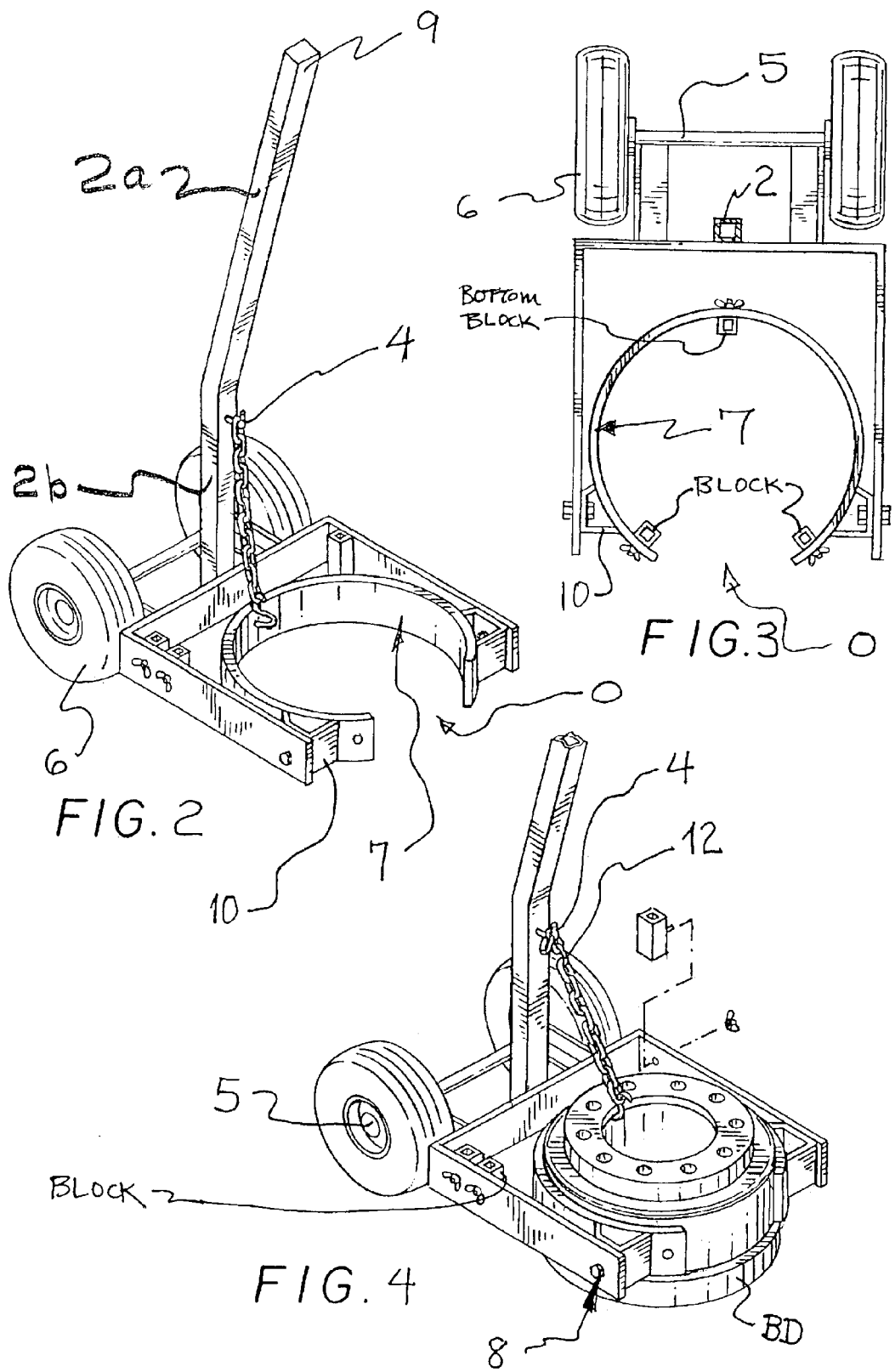

HAND TRUCK FOR MOVING, MANIPULATING, AND ALIGNING OBJECTS

CROSS REFERENCE TO RELATED APPLICATIONS

This application is a continuation of application Ser. No. 09/498,760, filed Jan. 27, 2000 now abandoned which application claims the priority benefit of application No. 60/117,428, filed Jan. 27, 1999, and each of which is incorporated herein by reference.

FIELD OF THE INVENTION

This invention relates to carts. More particularly, this invention relates to hand trucks for picking up and moving objects. Most particularly, this invention relates to hand trucks for picking up, manipulating, and aligning one object with another object, such as aligning the brake drum of a truck with a truck axle.

BACKGROUND OF THE INVENTION

Hand trucks, such as hand trucks having solid wheels or pneumatic tires are known.

Conventional hand trucks have drawbacks such as being heavy, complicated to manufacture, and complicated to use. They also require relatively great strength to operate and to manipulate objects which are supported thereby, as well as being relatively difficult to operate for lifting objects up for moving such objects from one place to another.

A conventional hand truck is known for use in picking up a truck brake drum, for example, moving it to a desired location, and aligning it with the axle of a truck for placing the moved brake drum onto the axle at a desired height and orientation. That known hand truck has a relatively large number of moving parts, such as hand-operated screws for adjusting the height of a carried/supported object relative to the hand truck (and, hence, relative to the floor on which the hand truck is being operated). Thus, when a user wants to move a brake drum into position onto an axle, for example, once the desired location has been reached, the user must lean over while supporting the entire weight of the brake drum with one hand, while using the other hand to operate the adjustment for controlling the height of the brake drum relative to the ground. This is a difficult task even for strong and experienced users of that conventional hand truck.

Accordingly, it will be seen that there is a need for a hand truck which overcomes the drawbacks of the prior art.

OBJECTS AND SUMMARY OF THE INVENTION

It is an object of the invention to provide a hand truck which overcomes the drawbacks of the prior art hand trucks.

A further object of the invention is to provide a hand truck which is easier to operate than known hand trucks.

Another object of the invention is to provide a hand truck which may be readily operated by users having a greater variety of physical skills than known hand trucks.

A still further object of the invention is to provide a hand truck which provides for 2-handed supporting of the weight of an object carried by the hand truck during transport, and during the process of locating the transported object in a desired location.

Yet another object of the invention is to provide a hand truck which provides for 2-handed support of the moved object, even while aligning the moved object with another object, such as during the placement of a supported and moved truck brake drum on an axle of a truck.

Yet another object of the invention is to provide a hand truck which requires fewer parts for construction thereof.

Another object of the invention is to provide a hand truck which has fewer moving parts than known hand trucks.

A further object of the invention is to provide a hand truck which may be converted for carrying different sizes of truck brake drums.

In summary, the invention includes a hand truck or cart having a body and a wheel attached to the body. Preferably, a support ring is movably attached to the body. Most preferably, the support ring is configured for engaging and transporting a brake drum. Most preferably, the support ring is sufficiently flexible so that the support ring can accommodate different objects, such as different sizes of brake drums.

FIGS. 1–10 show various views of the cart according to the invention; specifically, a truck drum caddy that is particularly suited for lifting and transporting various sizes of brake drums, and then placing the brake drums on any of various heights of truck axles.

BRIEF DESCRIPTION OF THE DRAWINGS

FIG. 2 is a front perspective view of preferred embodiment of the invention with blocks attached;

FIG. 3 is a top view of FIG. 2 with blocks removed;

FIG. 4 is a view of the embodiment of FIG. 2, in use;

DETAILED DESCRIPTION OF THE PREFERRED EMBODIMENTS

Figure 1:
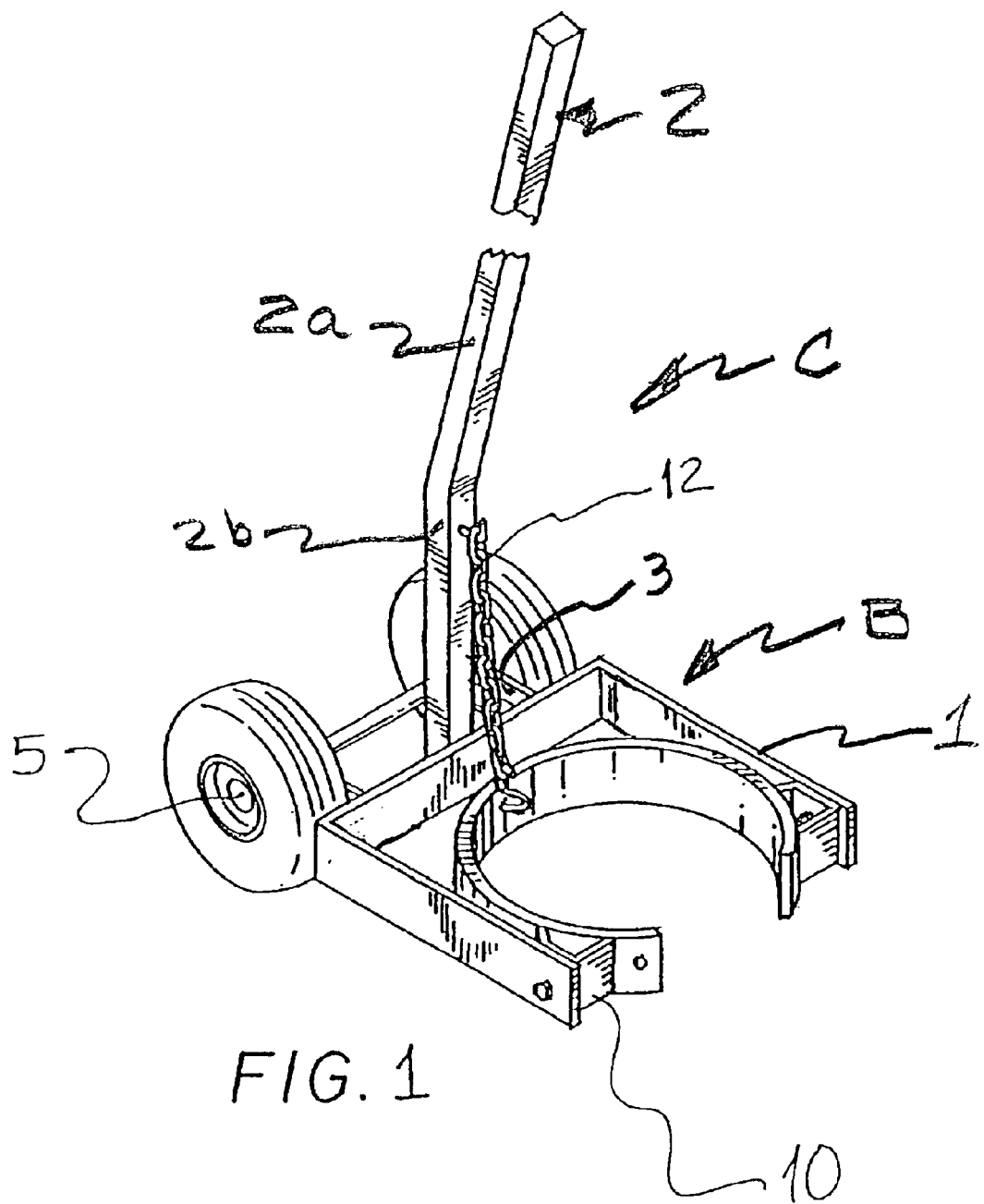
FIG. 1 shows the first preferred embodiment of the invention.

FIG. 1 shows a preferred embodiment of a hand truck according to the invention. Cart C includes a body B. Body B may be provided with a support 1 and one or more outwardly extending brackets 3.

A handle 2 is typically attached to one or both of support 1 and bracket 3.

Preferably, handle 2 includes a handle or first portion 2a attached to body B and an extension or second portion 2b attached to and extending from the handle 2a and body B.

Most preferably, second portion 2a extends transversely relative to first portion 2b. It is advantageous that second portion 2a extends at a sufficiently large angle relative to first portion 2a so that a user may move the free end 9 around without straining his or her back.

Typically, handle 2a extends upwardly away from wheel 6; i.e., away from the floor when extension 2b extends substantially parallel to the floor, for example.

Wheel 6 is preferably rotatably attached to body B by use of an axle 5.

A hook 4 may be provided on handle 2 for securing a chain 12 thereto, as well be described below.

A support ring or ring assembly 7 is provided on body B. Support ring 7 is configured for receiving objects, such as a brake drum. Preferably, support ring 7 is provided with a mouth or opening O to enhance the flexibility thereof, so that the support ring 7 readily accommodates various sizes and diameters of brake drums BD.

Preferably, a swivel point 8 is provided between support ring 7 and body B so that ring 7 is movably attached thereto. Conveniently, one or more extensions 10 may be provided between swivel point 8 and ring 7 to simplify the attachment thereof.

Typically, a lock will be provided for selectively restricting movement of the support ring relative to body B, such as when a brake drum is lifted off the floor. The lock may include hook 4 and a piece of chain 12, as shown in FIGS. 1 and 5–8.

Good results have been achieved when the cart or hand truck or truck drum caddy C has been made as shown and with the materials set forth in the Appendix.

OPERATION

Figure 5:
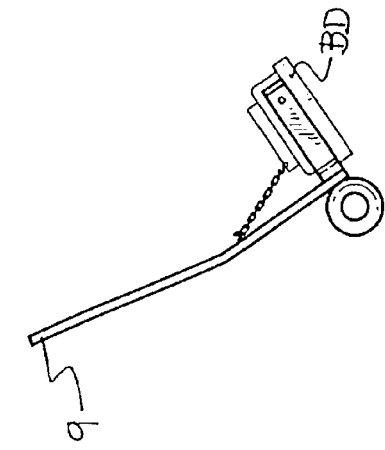
FIG. 5 is a somewhat schematic side view of the embodiments of, in use, as a brake drum, for example, is being engaged.
Figure 6:
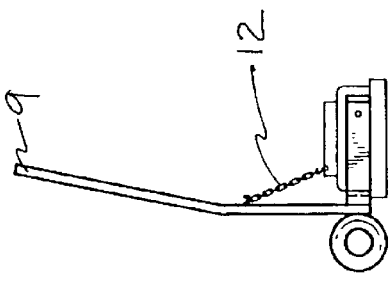
FIG. 6 is a further view showing the brake drum being engaged by the hand truck.

In use, the operator approaches the brake drum B to be picked up as shown in FIG. 5, and places ring 7 over the brake drum as shown in the further preferred embodiment of FIG. 2 by stopping the cart near to the brake drum, raising free end 9 to a substantially vertical position relative to the floor, and slipping ring 7 over the brake drum as shown in FIG. 6.

Then, to secure the brake drum prior to lifting, a length of chain having the s-hook thereon is attached to a convenient place on the brake drum by use of the s-hook as shown in FIGS. 4 and 6. The other free end of the chain is then hooked over hook 4 by use of one of its free links as shown.

Figure 7:
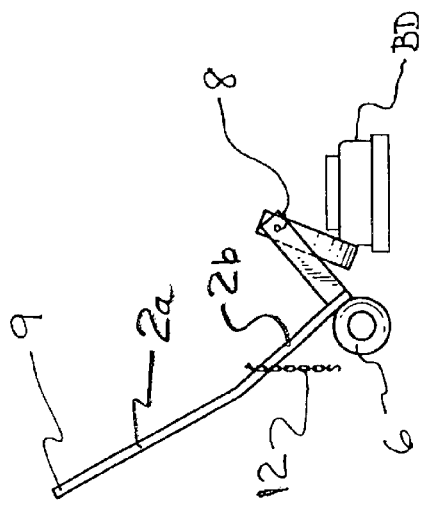
FIG. 7 is a further view showing the brake drum being lifted.

After securing the brake drum with the chain 12, the operator uses the weight of his or her body in leaning back as shown in FIG. 7 with the foot against the axle 5, for example, while moving free end 9 and, hence extension 2b, downwardly toward the floor on which wheels 6 rest.

Figure 8:
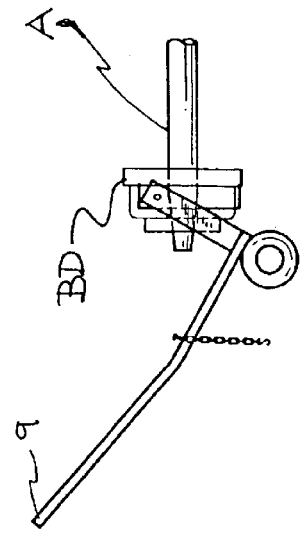
FIG. 8 is a further view showing the chain being detached from the brake drum for transport.
Figure 9:
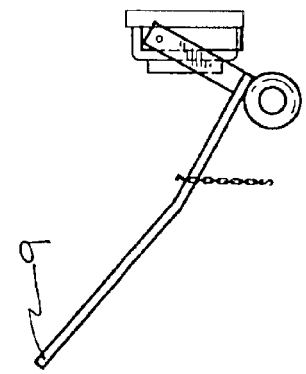
FIG. 9 is a view showing transport of brake drum.

After free end 9 has been lowered to a position such as shown in FIG. 8, the chain 12 may be detached from the transported brake drum. Thanks to swivel point 8, the ring 7 and the brake drum supported thereby will tend to assume a position extending substantially perpendicularly to the floor, such as shown FIG. 9. The supported brake drum swings freely about swivel point 8 thus making transport of the brake drum easier and less taxing to the operator.

Figure 10:
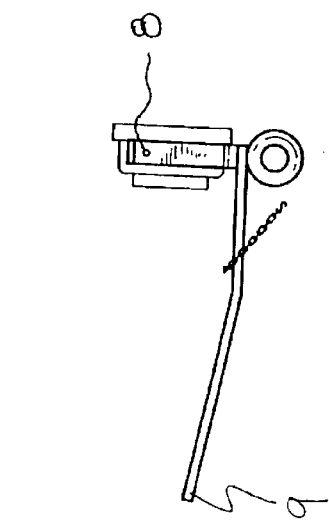
FIG. 10 is a view showing the brake drum as it is being installed on an axle.

When the desired location has been reached as shown in FIG. 10, the operator simply slides the freely rotatable supported brake drum onto the axle A of the vehicle, such as the illustrated truck axle A. Thanks to ergonomically correct handle 2 and swivel point 8, as well as other features of the invention, the user easily moves free end 9 of handle 2 up and down and back and forth until the exact position is achieved. That is, handle 2 is moved around until the transported and supported brake drum is aligned with the axle A, as desired. Once the desired alignment has been achieved, the operator moves forward and slides the supported brake drum BD into position on the axle. The thus properly positioned brake drum is secured with fasteners and worked on in a conventional manner.

To remove a brake drum BD from an axle A and move it to a desired location, the above process is reversed. It will be appreciated that the hand truck C according to the invention may be made of various materials, and set forth above, and within the skills of a person having ordinary skill in the art.

FIG. 2 shows the further preferred embodiment of the cart according to the invention that is suited for carrying different sizes of truck brake drums.

As shown in FIG. 3, if a small (e.g., 15" drum) is to be lifted, the user attaches three (3) blocks to the ring assembly, for example.

If a larger (e.g., 16.5") drum is to be carried, then only one of the three blocks need be used. Good results have been achieved when none (0) of the blocks have been used when carrying 16.5" drums.

Conveniently, one or more of the blocks may be attached to the frame for storage, as shown in FIGS. 2 and 4.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended thereto.

What is claimed is:

1. A cart for engaging, supporting, and transporting an object, said cart comprising:
  a) a body;
  b) a wheel attached to said body;
  c) a swivel point provided on said body;
  d) a substantially circular support ring freely rotatably attached to said swivel point on said body, said substantially circular support ring including a center, and said substantially circular support ring being configured for engaging, supporting, and transporting an object;
  e) said substantially circular support ring including a mouth for enhancing the flexibility thereof;
  f) said substantially circular support ring being attached to said swivel point at a location on said ring between the center of the ring and the mouth; and
  g) said support ring freely rotating relative to said body when said cart is in use engaging, supporting, and transporting an object.

2. A cart as in claim 1, wherein:
  a) a handle is attached to said body.

3. A cart as in claim 2, wherein:
  a) an extension is provided between said handle and said body, and the handle extends transversely relative to the extension.

4. A cart as in claim wherein:
  a) said handle extends away from said wheel.

5. A cart as in claim 1, wherein:
  a) said wheel includes first and second spaced apart wheels.

6. A cart as in claim 1, wherein:
  a) said support ring is sufficiently flexible so that said support ring can accommodate different objects.

7. A cart as in claim 1, wherein:
  a) a lock is provided for selectively restricting movement of the freely rotatably attached support ring when an object is engaged by said support ring for lifting the object off a floor.

8. A cart as in claim 7, wherein:
  a) a handle is attached to said body; and
  b) said lock includes a chain having a hook, said hook being disposed on said handle for securing said chain.

9. A cart as in claim 8, wherein:

a) said hook includes an s-hook provided on said chain; and b) said s-hook is configured for engaging a brake drum supported by said support ring.

10. A cart as in claim 9, wherein:

a) a block is provided on said support ring, said block being sufficiently large for reducing the effective inner diameter of the support ring.

11. A cart as in claim 10, wherein:

a) said block is detachably attached to said support ring.

12. A cart as in claim 10, wherein:

a) said block includes a plurality of blocks.

13. A claim as in claim 10, wherein:

a) said block is provided on the interior of said support ring.

14. A cart as in claim 2, wherein:

a) said mouth has an open portion, and said open portion faces away from said handle.

15. A cart as in claim 1, wherein:

a) a lock is provided for selectively restricting movement of the freely rotatably attached support ring when an object is engaged by the support ring for lifting the support ring off a floor, the lock being configured for allowing the freely rotatably attached support ring to move substantially freely during transporting of the object engaged by the support ring.

16. A cart as in claim 1, wherein:

a) said swivel point is disposed directly adjacent the mouth.

* * * * *